US012574786B2

(12) United States Patent
Joseph et al.

(10) Patent No.: US 12,574,786 B2
(45) Date of Patent: Mar. 10, 2026

(54) CONFIGURABLE DISTRIBUTION OF NETWORK DEVICE USAGE DATA BASED ON RULES

(71) Applicant: Cisco Technology, Inc., San Jose, CA (US)

(72) Inventors: Praveen Joseph, San Jose, CA (US); Sunil Bhambani, Maharashtra (IN); Praveen Hassan Ponnappa, Karnataka (IN); Kellia Surendran Suriya Ganesh, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 367 days.

(21) Appl. No.: 18/318,260

(22) Filed: May 16, 2023

(65) Prior Publication Data

US 2024/0388938 A1 Nov. 21, 2024

(51) Int. Cl.
| | |
|---|---|
| *H04W 24/10* | (2009.01) |
| *H04W 4/24* | (2024.01) |
| *H04W 24/02* | (2009.01) |

(52) U.S. Cl.
CPC ............. *H04W 24/10* (2013.01); *H04W 4/24* (2013.01); *H04W 24/02* (2013.01)

(58) Field of Classification Search
CPC ........ H04W 4/24; H04W 24/02; H04W 24/10
See application file for complete search history.

(56) References Cited

U.S. PATENT DOCUMENTS

| | | | |
|---|---|---|---|
| 2015/0134562 A1* | 5/2015 | Rajapakse .............. | G06Q 10/00 |
| 2016/0205546 A1 | 7/2016 | Poon et al. | |
| 2020/0068074 A1 | 2/2020 | Cai et al. | |
| 2022/0014512 A1* | 1/2022 | Raleigh .................. | H04L 63/20 |
| 2022/0058101 A1 | 2/2022 | Boone, Jr. et al. | |
| 2022/0109759 A1* | 4/2022 | Bhoria .................... | H04W 4/24 |
| 2022/0141630 A1 | 5/2022 | Agarwal et al. | |
| 2022/0240066 A1 | 7/2022 | Raleigh et al. | |
| 2022/0279075 A1 | 9/2022 | Fan et al. | |
| 2024/0155344 A1* | 5/2024 | Hofstaedter .......... | H04L 43/045 |

* cited by examiner

*Primary Examiner* — Ronald B Abelson
(74) *Attorney, Agent, or Firm* — Edell, Shapiro & Finnan, LLC

(57) ABSTRACT

One or more processors of a device management platform receive, from a plurality of networks, usage data indicating usage of devices on the plurality of networks. The one or more processors of the device management platform apply rules to the usage data to identify requested usage data for entities associated with the devices. The rules are defined by the entities to individually indicate the requested usage data. The one or more processors of the device management platform send the requested usage data to one or more destinations of the entities indicated by the rules.

20 Claims, 6 Drawing Sheets

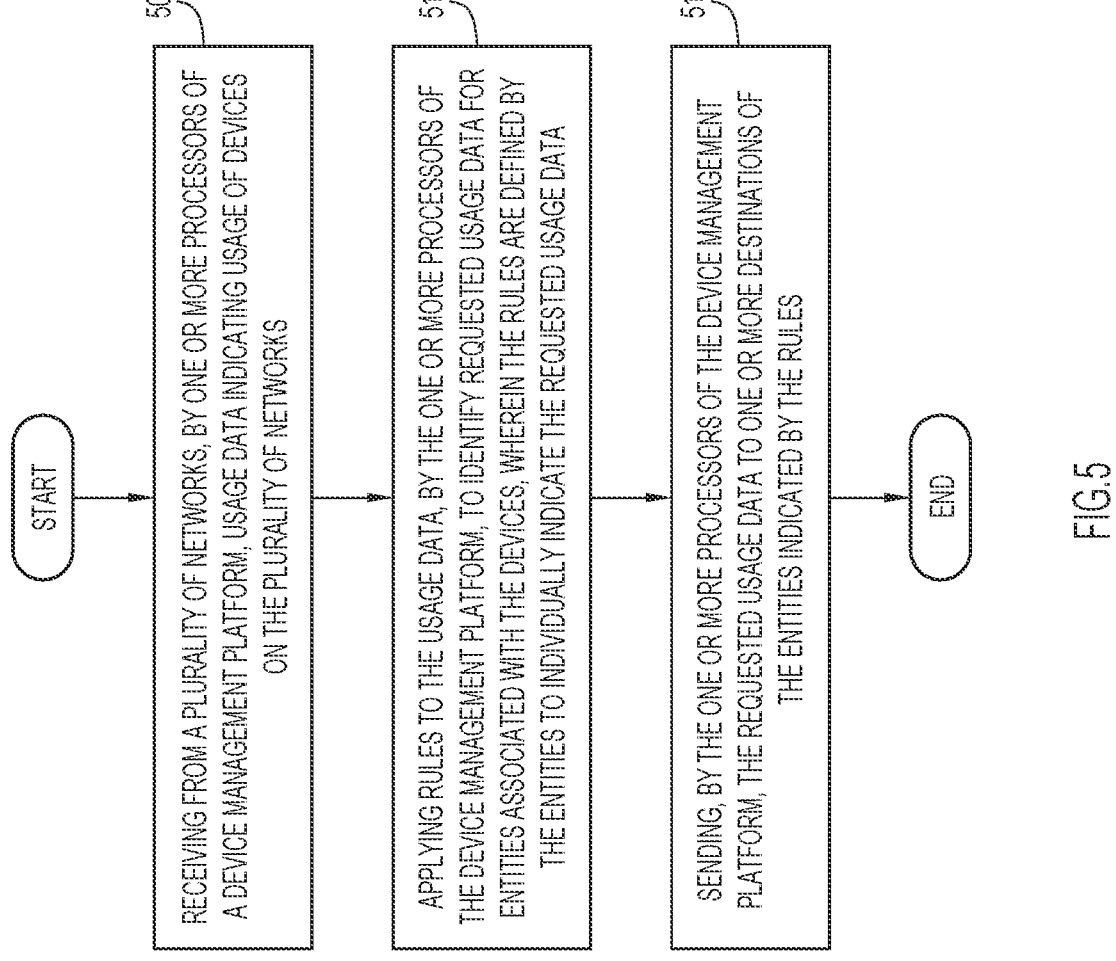

500

505 RECEIVING FROM A PLURALITY OF NETWORKS, BY ONE OR MORE PROCESSORS OF A DEVICE MANAGEMENT PLATFORM, USAGE DATA INDICATING USAGE OF DEVICES ON THE PLURALITY OF NETWORKS

510 APPLYING RULES TO THE USAGE DATA, BY THE ONE OR MORE PROCESSORS OF THE DEVICE MANAGEMENT PLATFORM, TO IDENTIFY REQUESTED USAGE DATA FOR ENTITIES ASSOCIATED WITH THE DEVICES, WHEREIN THE RULES ARE DEFINED BY THE ENTITIES TO INDIVIDUALLY INDICATE THE REQUESTED USAGE DATA

515 SENDING, BY THE ONE OR MORE PROCESSORS OF THE DEVICE MANAGEMENT PLATFORM, THE REQUESTED USAGE DATA TO ONE OR MORE DESTINATIONS OF THE ENTITIES INDICATED BY THE RULES

FIG.5

CONFIGURABLE DISTRIBUTION OF NETWORK DEVICE USAGE DATA BASED ON RULES

TECHNICAL FIELD

The present disclosure relates to network device monitoring.

BACKGROUND

It is expected that the number of 5G devices, which includes consumer, Internet of Things (IoT), and private cellular devices, will grow exponentially. Cloud solutions, such as a control center, help service providers (SPs) and enterprises manage these devices and the associated services. A control center receives real-time information about the device connectivity and usage from various network integration points, such as a charging function (CHF), charging gateway (CGW), etc. The control center uses this data to drive various features, such as billing and rating, monitoring, automation rules, etc.

A control center has the ability to generate reports, but these reports contain only a subset of the information that is obtained from a core network and the duration between reports is high.

BRIEF DESCRIPTION OF THE DRAWINGS

FIG. 5 illustrates a flowchart of a generalized method for distributing charging records, according to an example embodiment.

DESCRIPTION OF EXAMPLE EMBODIMENTS

Overview

Figure 1:
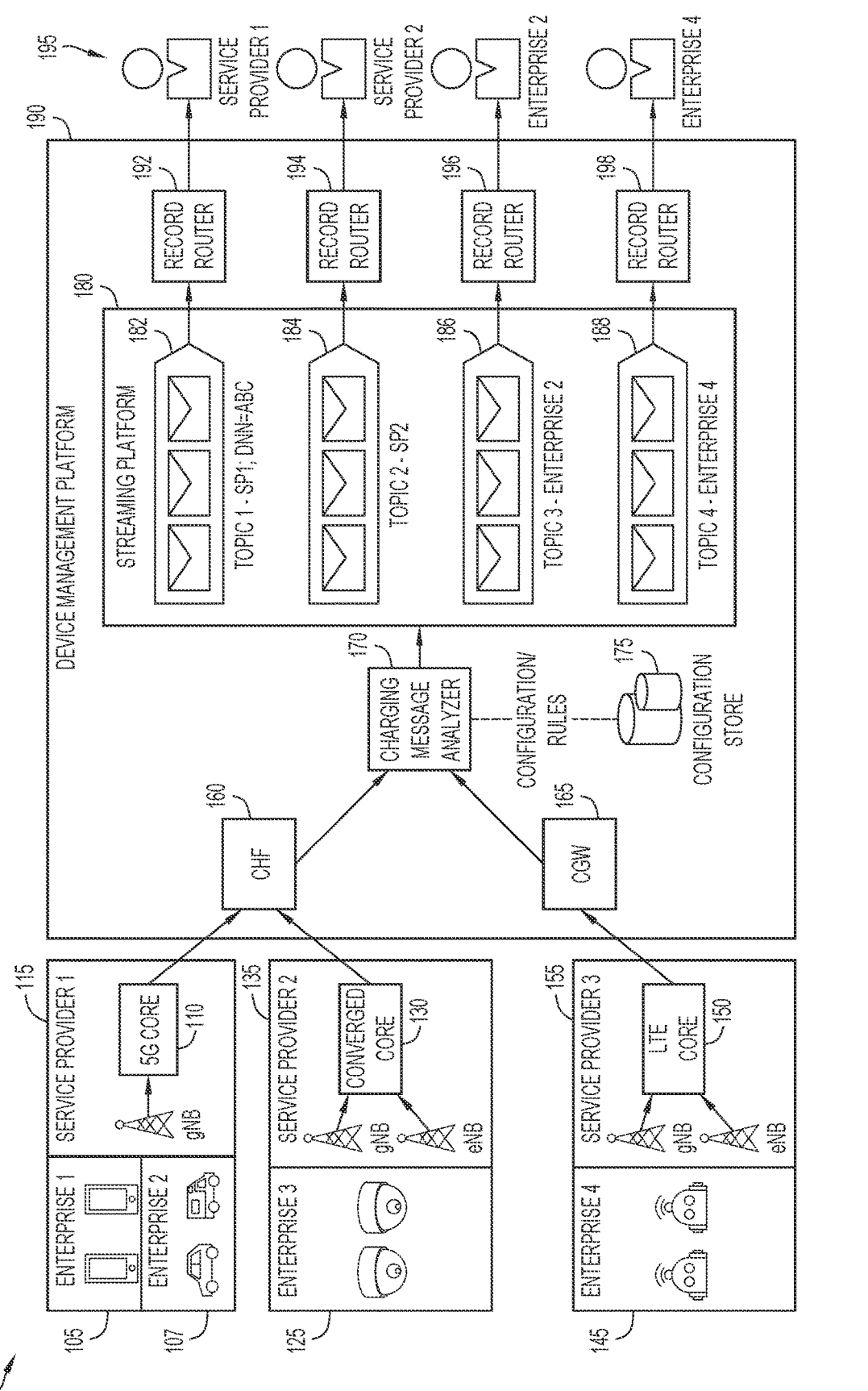
FIG. 1 illustrates a networking environment with plural service providers integrating with a device management platform, according to an example embodiment.

In one example embodiment, one or more processors of a device management platform receive, from a plurality of networks, usage data indicating usage of devices on the plurality of networks. The one or more processors of the device management platform apply rules to the usage data to identify requested usage data for entities associated with the devices. The rules are defined by the entities to individually indicate the requested usage data. The one or more processors of the device management platform send the requested usage data to one or more destinations of the entities indicated by the rules.

Example Embodiments

In an embodiment, a cloud-based cellular connectivity or device management platform or service provides capabilities to manage devices and associated services of entities (e.g., service providers (SPs), enterprises, etc.). Embodiments provide capability for such platforms to send usage records to the service providers (SPs) and/or enterprises, which they can use for custom analytics, monitoring, and in some cases (like consumer 5G), to generate invoices for individual consumers. An embodiment enables service providers (SPs) and/or enterprises to define rules to deliver device usage records, enables a device management platform to support charging data record (CDR) delivery to service provider business support systems (BSS) for consumer 5G, determines routing rules as part of real-time request processing and places records on appropriate queue (s) (or topic(s)) based on the routing rules, and supports a mix of 3rd Generation Partnership Project (3GPP) specification in a multi-tenant system.

In a converged core (4G and 5G) or a 5G core, charging functionality is performed by a charging function (CHF) network function (NF). CHF receives various charging events associated with connected devices (e.g., Data Session, short message service (SMS), etc.) from the consumer NFs, such as session management function (SMF) and short message service function (SMSF). CHF deployment in a cloud-based connectivity or device management platform can receive these events from different service provider (SP) networks. In a long-term evolution (LTE) (4G) network, a charging gateway (CGW) component deployed in a connectivity or device management platform can receive the usage records from the connected SP networks. The device management platform may use the data for various purposes, such as invoicing, analytics for monitoring device function or operation and/or detecting anomalies, etc.

If service providers (SP) and enterprises can get access to connectivity and usage information, they can use it for custom analytics, monitoring of device function or operation, and in some cases (like consumer 5G), to generate invoices for individual consumers.

An embodiment enables service providers (SPs), enterprises, and/or other entities to: configure how frequently the data needs to be sent; configure the 3rd Generation Partnership Project (3GPP) version supported by an SP/enterprise billing/reporting system; configure the type of records to be sent (e.g., Data Session, short message service (SMS), etc. based on identifiers, such as access point name (APN), data network name (DNN), etc.); configure how to transfer information to the user (e.g., file transfer, individual records, etc.); configure rules to split records based on various parameters, such as access point name (APN)/data network name (DNN), Rating Group, enterprise (for SPs) etc.; and configure rules to avoid over-flooding their system with unwanted records (e.g., records indicating no use (zero-usage records), etc.).

FIG. 1 illustrates a network environment 100 depicting plural service providers integrating with a device management platform and generating charging data records (CDRs) to be consumed by service providers and/or enterprises. By way of example, the embodiments are described with respect to service providers (SPs) and enterprises. However, the embodiments may be utilized with respect to any other entities, any type of information from networks, and any type of record or message format sent to the entities.

An embodiment may provide the following features: an ability for service providers (SPs) and enterprises to configure how charging data should be segregated and reported, and to configure various other parameters, such as a version of 3rd Generation Partnership Project (3GPP) standard supported by the SP or enterprise system; a charging message analyzer which gets the charging requests in real-time and applies the associated configuration/rules to determine the destinations to send the record; and a record router, which encodes the data into charging data (CDR) or other records and routes them to an eventual destination defined by an SP and/or enterprise. The charging data records (CDRs) are generated based on encoding rules and a 3GPP version specified by the SP and/or enterprise.

In an embodiment, logic (e.g., charging message analyzer 170) processes events received from a charging function (CHF)/charging gateway (CGW)/authentication, authorization and accounting (AAA) and, based on a configuration (or rules) defined by service providers (SPs) and/or enterprises, the events are routed to the desired destination using 3rd Generation Partnership Project (3GPP) compliant charging data records (CDRs). This enables an SP and/or enterprise to use the event data for custom analytics, monitoring device function or operation, and in some cases (like consumer 5G), to generate invoices for individual devices.

Network environment 100 includes a device management platform 190 to receive and distribute information from one or more service provider networks to systems 195 of various entities (e.g., service providers, enterprises, etc.). The device management platform is preferably a cloud-based platform. By way of example, device management platform 190 may receive information from service providers 115 (e.g., Service Provider 1 as viewed in FIG. 1), 135 (e.g., Service Provider 2 as viewed in FIG. 1), and 155 (Service Provider 3 as viewed in FIG. 1). Service provider 115 may include a 5G core network 110 that services devices (e.g., user devices, Internet of Things (IoT) devices, etc.) of enterprises 105 (e.g., Enterprise 1 as viewed in FIG. 1) and 107 (e.g. Enterprise 2 as viewed in FIG. 1). Core network 110 processes connectivity requests to authenticate and validate the devices for network connectivity.

Service provider 135 may include a converged core network 130 (e.g., 4G and 5G) that services devices (e.g., user devices, Internet of Things (IoT) devices, etc.) of an enterprise 125 (e.g., Enterprise 3 as viewed in FIG. 1). Core network 130 processes connectivity requests to authenticate and validate the devices for network connectivity.

In addition, service provider 155 may include a long-term evolution (LTE) (4G) core network 150 that services devices (e.g., user devices, Internet of Things (IoT) devices, etc.) of an enterprise 145 (e.g., Enterprise 4 as viewed in FIG. 1). Core network 150 processes connectivity requests to authenticate and validate the devices for network connectivity.

Core networks 110, 130, and 150 provide information to device management platform 190 for configurable selection and distribution to systems 195 of the service providers (SPs) and/or enterprises (e.g., a system (and user) of Service Provider 1, a system (and user) of Service Provider 2, a system (and user) of Enterprise 2, and a system (and user) of Enterprise 4 as viewed in FIG. 1). However, the service providers may provide service to any quantity or types of enterprises in any desired arrangement. The service providers may refer to carriers providing network services, while the enterprises may be companies or other organizations using the network services provided by the service providers. Accordingly, embodiments enable the carriers and/or organizations to obtain usage data for the networks according to their preferences (e.g., configuration (or rules) defined by the carrier/organization) for various purposes (e.g., custom analytics, monitoring of device function or operation, generate invoices, etc.). The usage data may include any connectivity, usage, events, and/or other consumption of network services by a corresponding device (e.g., connection requests, calls, data usage, messaging, location, etc.).

Device management platform 190 includes a charging function (CHF) 160, a charging gateway (CGW) 165, a charging message analyzer 170, a configuration store 175, a streaming platform 180, and record routers 192, 194, 196, and 198. CHF 160 and CGW 165 receive information from the service provider core networks, and may provide billing, charging and/or rating processing for network device usage. The CHF and CGW receive real-time information (or feeds) from the service provider core networks and provide the information to charging message analyzer 170. The information preferably includes device usage and/or other information pertaining to events on the core networks (e.g., any connectivity, usage, events, and/or other consumption of network services by a corresponding device, such as connection requests, calls, data usage, messaging, location, etc.). By way of example, CHF 160 may receive information from core networks 110 and 130, while CGW 165 may receive information from core network 150. However, CHF 160 and CGW 165 may receive information from any core networks.

Charging message analyzer 170 processes the information received from charging function (CHF) 160 and charging gateway (CGW) 165 based on a configuration stored in configuration store 175. The configuration includes a set of rules defined by service providers (SPs) and/or enterprises (e.g., indicating the type of data to be received, the frequency of sending the data (e.g., a time interval for sending the data, such as every 1 minute, 5 minutes, 15 minutes, etc.), the format of the data (e.g., charging data (CDR) or other record), the destinations for the data, etc.). The processed information is preferably routed to desired destinations indicated in the rules using 3rd Generation Partnership Project (3GPP) compliant charging data records (CDRs). For example, charging message analyzer 170 provides the processed information to streaming platform 180. The streaming platform employs a publish/subscribe mechanism to distribute information, where the information is placed on a corresponding queue associated with a topic and the information is accessible to users that subscribe to that topic. By way of example, streaming platform 180 may include queues 182 (e.g., associated with Topic 1 for Service Provider 1 as viewed in FIG. 1), 184 (e.g., associated with Topic 2 for Service Provider 2 as viewed in FIG. 1), 186 (e.g., associated with Topic 3 for Enterprise 2 as viewed in FIG. 1), and 188 (e.g., associated with Topic 4 for Enterprise 4 as viewed in FIG. 1). Charging message analyzer 170 provides information to a topic (or queue) based on the rules defined by a corresponding service provider (SP) and/or enterprise. However, the streaming platform may include any quantity of queues (or topics) associated with any service providers, enterprises, and/or other entities.

The information is retrieved from streaming platform 180 by record routers associated with the queues (or topics). By way of example, device management platform 190 includes record routers 192, 194, 196, and 198 with each record router preferably retrieving information from a corresponding queue (or topic). By way of further example, record router 192 corresponds to queue (or topic) 182, record router 194 corresponds to queue (or topic) 184, record router 196 corresponds to queue (or topic) 186, and record router 198 corresponds to queue (or topic) 188. A record router generates messages containing the information from a corresponding queue (or topic) in a format according to rules defined by the service provider (SP) and/or enterprise. The generated message is sent to an eventual destination defined by the rules. By way of further example, record router 192 may send the generated message to system 195 of Service Provider 1 (e.g., as viewed in FIG. 1), record router 194 may send the generated message to system 195 of Service Provider 2 (e.g., as viewed in FIG. 1), record router 196 may send the generated message to system 195 of Enterprise 2 (e.g., as viewed in FIG. 1), and record router 198 may send the generated message to system 195 of Enterprise 4 (e.g., as viewed in FIG. 1). However, the device management platform may include any quantity of record routers associated with any queues (or topics) and entities (e.g., service providers, enterprises, etc.).

Service providers (SPs) and/or enterprises may configure one or more of the following on device management platform 190 based on the rules: is reporting enabled for the SP and/or enterprise; how frequently the data needs to be reported (e.g., frequency of reporting data, such as every 5, 10, or 15 minutes, near real-time, etc.); 3rd Generation Partnership Project (3GPP) version of a record that will be sent to an SP and/or enterprise system; type of data to be reported (e.g., short message service (SMS), Data Session usage, connectivity, certain events, where multiple options can be selected at a time, etc.); how to transfer the information to the SP and/or enterprise system (e.g., file transfer (Bx interface), GTP Prime (Ga interface), individual records, etc.); transfer destination (e.g., host, credentials, and path for a file record transfer; network address; topic; etc.); record segregation rules for file transfer (e.g., split records based on various parameters, such as access point name (APN)/data network name (DNN), Rating Group, enterprise (for SPs) etc., etc.); and additional rules specifying what data should be sent (e.g., rules to avoid over-flooding a system with records containing no usage (zero-usage records), etc.). The above rules defining a configuration from the SPs and enterprises are saved in configuration store 175.

Figure 2:
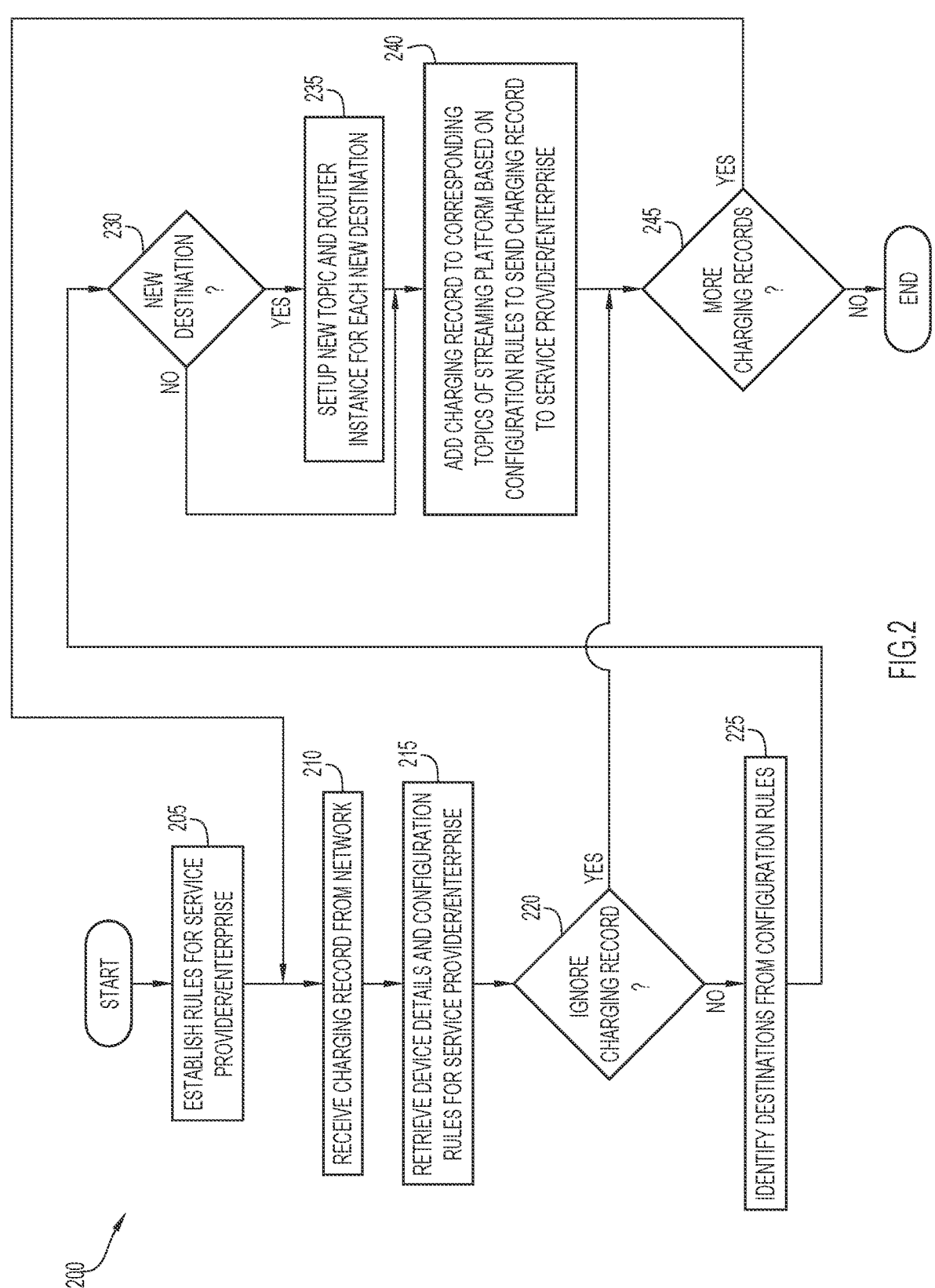
FIG. 2 is a flowchart of a method for distributing charging records based on rules defined by service providers and/or enterprises, according to an example embodiment.

With continuing reference to FIG. 1, FIG. 2 illustrates a flowchart of an example method 200 for distributing charging or other records based on rules defined by service providers and/or enterprises, according to an example embodiment. By way of example, FIG. 2 is described with respect to service providers (SPs) and enterprises. However, the method of FIG. 2 may be utilized with respect to any other entities, any type of information from networks, and any type of record or message format sent to the entities.

Initially, a service provider (SP), enterprise, or other entity may configure and establish rules for device management platform 190 at operation 205. The rules may be of any format and indicate various parameters in order to identify and distribute information to destinations of the service provider (SP) and/or enterprise. For example, the rules may indicate one or more conditions, parameters, and/or actions (e.g., message formats, frequency of reporting, record types to report, etc.). A user of a service provider (SP) or enterprise may utilize a graphical user or other interface provided by device management platform 190 to create, modify, and/or remove a configuration or rules. Alternatively, the rules may be created, modified, and/or removed in a user device (e.g., via a user or other interface, file, etc.) and uploaded to the device management platform (e.g., over a network, device to device communication, etc.). The configuration or rules are stored in configuration store 175.

A charging record may be received at charging function (CHF) 160 or charging gateway (CGW) 165 from a core network 110, 130, and/or 150. Charging records may originate from different network elements, such as session management function (SMF), short message service function (SMSF), packet data network gateway (P-GW), etc. The charging record contains information about a device (e.g., international mobile subscriber identity (IMSI), etc.), type of usage, actual usage, etc. The charging record is provided to charging message analyzer 170 at operation 210.

Charging message analyzer 170 retrieves device information stored in a database (e.g., device service provider (SP), enterprise, etc.) based on the device information in the charging record, and further retrieves the configuration (or set of rules) for the SP and/or enterprise associated with the device and stored in configuration store 175 at operation 215. The charging message analyzer analyzes the retrieved rules for processing of the charging record. When the charging record can be ignored based on the retrieved rules as determined at operation 220, no further processing of the charging record is needed, and a check for further charging records to process is performed at operation 245 as described below.

When the configuration (or set of rules) indicates that the charging record is to be processed as determined at operation 220, charging message analyzer 170 identifies one or more destinations for the charging record from the retrieved rules at operation 225. The rules may specify one or more destinations for a charging record (e.g., one or more service providers (SPs) and/or enterprises for the charging record, etc.). In other words, a charging record may be associated with a single destination or plural destinations (e.g., a service provider (SP) and a corresponding enterprise using that service provider (SP) may request the charging record, etc.). When one or more new destinations are identified as determined at operation 230, a new topic (or queue) and a new router instance (or record router) are established for each new destination at operation 235. A topic name may be dynamically generated based on a destination of the message (e.g., <data.charging.SPName.DNN>). Setting up a new router instance for the destination can be achieved using various conventional or other techniques (e.g., Kubernetes (K8) controllers, etc.).

Charging message analyzer 170 places the charging record on one or more queues (or topics) of streaming platform 180 based on the destinations indicated by the rules at operation 240 to send the charging record to the corresponding destinations of the service provider (SP) and/or enterprise (e.g., systems of a service provider (SP), enterprise, etc.).

The process is repeated from operation 210 in substantially the same manner described above until no further charging records are available as determined at operation 245.

Figure 3:
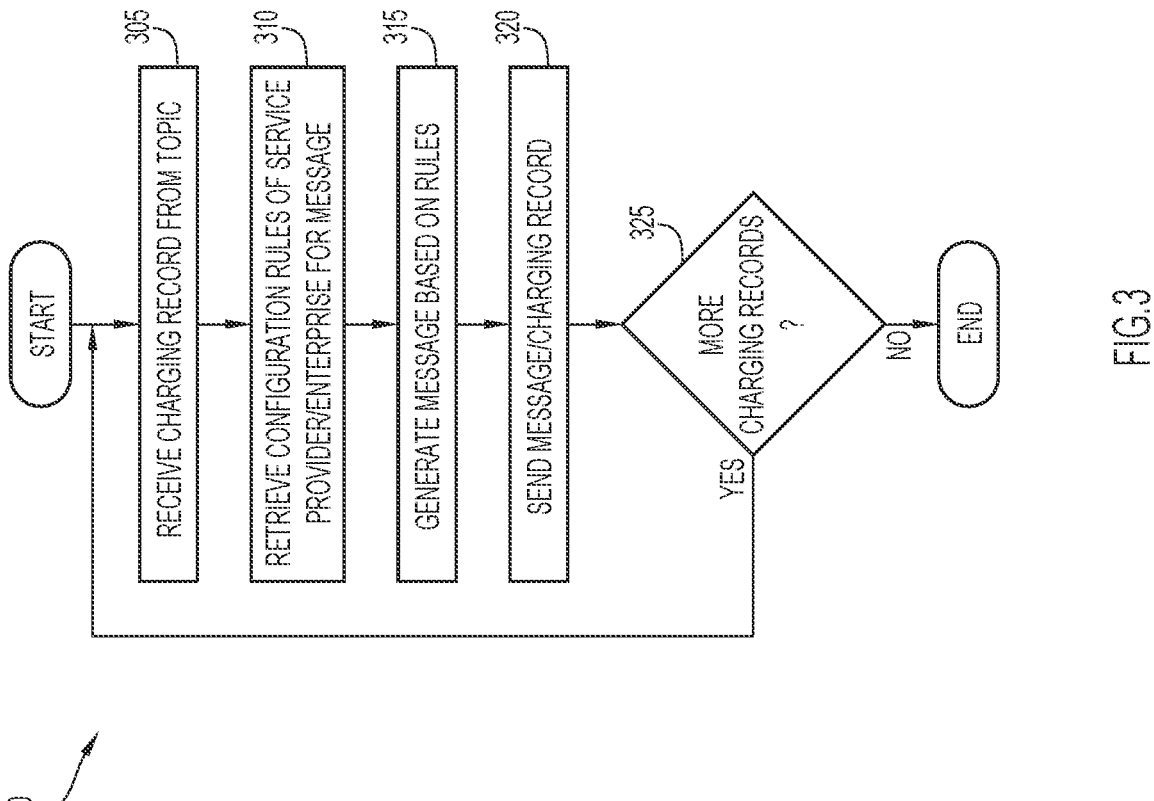
FIG. 3 is a flowchart of a method for generating and sending messages including charging records based on rules defined by service providers and/or enterprises, according to an example embodiment.

With continuing reference to FIGS. 1 and 2, FIG. 3 illustrates a flowchart of an example method 300 for generating and sending messages including charging records based on rules defined by service providers and/or enterprises, according to an example embodiment. By way of example, FIG. 3 is described with respect to service providers (SPs) and enterprises. However, the method of FIG. 3 may be utilized with respect to any other entities, any type of information from networks, and any type of record or message format sent to the entities.

Initially, charging message analyzer 170 processes charging records and places them on queues (or topics) of streaming platform 180 based on the rules as described above. A record router (e.g., record router 192, 194, 196, and/or 198) is subscribed to a corresponding topic, and reads the charging record from the corresponding topic (or queue) at operation 305. The record router further retrieves the configuration (or set of rules) of the service provider (SP) and/or enterprise associated with the record router from configuration store 175 at operation 310. The retrieved rules indicate a corresponding type and format (e.g., charging data record (CDR) format or file, etc.) for a message to be sent to a destination. The record router generates a message containing the charging record in an appropriate format based on the retrieved rules at operation 315 (e.g., based on a type of record, 3rd Generation Partnership Project (3GPP) version, etc.). Further, the record router may combine multiple records to generate a single file or send individual records based on the rules. The record router sends the generated message to the SP and/or enterprise system at operation 320 based on the destination indicated in the rules. The process is repeated from operation 305 in substantially the same manner described above until no further charging records are available as determined at operation 325.

Figure 4:
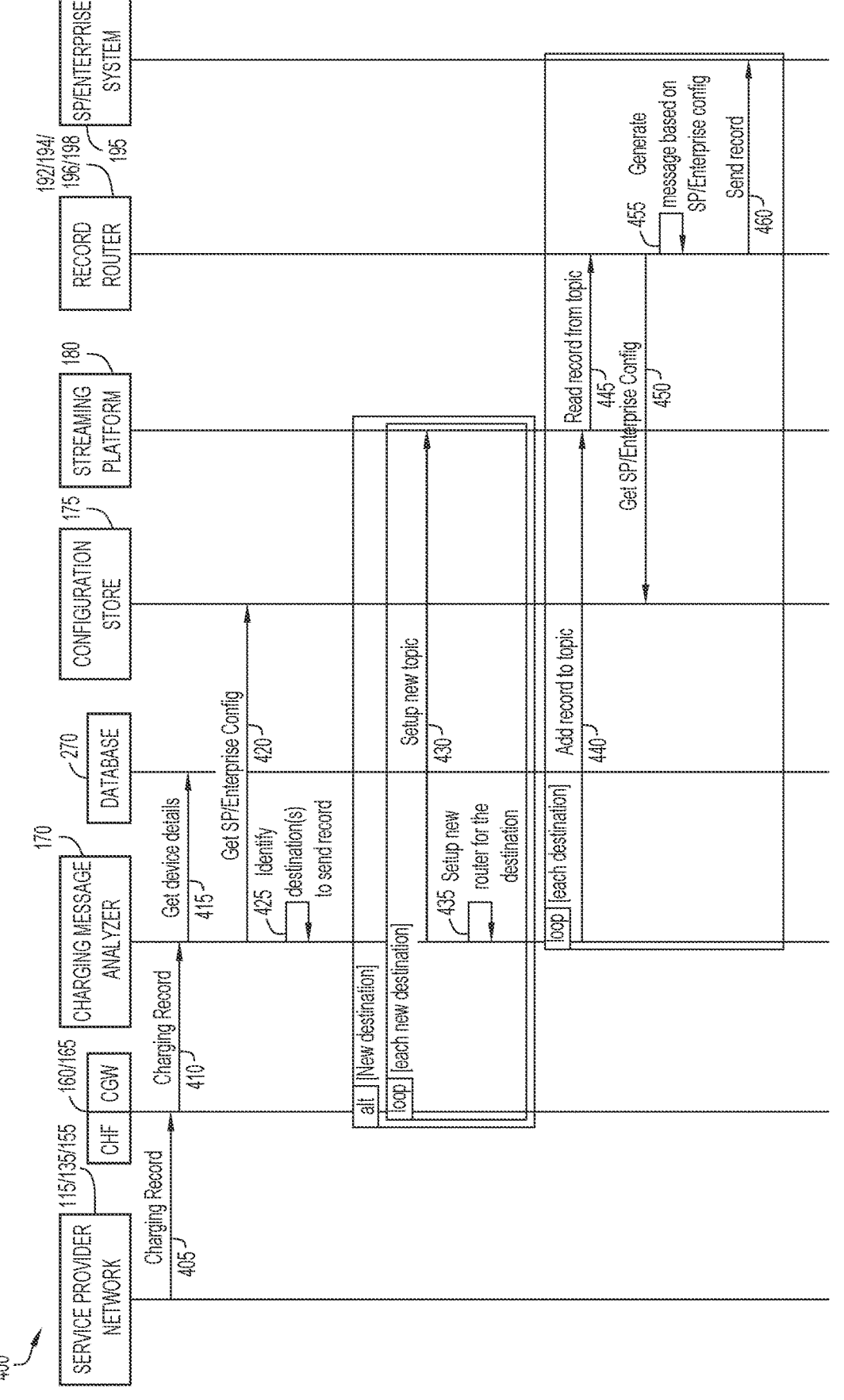
FIG. 4 illustrates a flow diagram of a method for processing data from a service provider network in a device management platform and sending the data to service providers and/or enterprises, according to an example embodiment.

With continuing reference to FIGS. 1-3, FIG. 4 illustrates a flow diagram of an example method 400 for processing data from a service provider network in a device management platform and sending the data to service providers and/or enterprises, according to an example embodiment. By way of example, FIG. 4 is described with respect to service providers (SPs) and enterprises. However, the method of FIG. 4 may be utilized with respect to any other entities, any type of information from networks, and any type of record or message format sent to the entities.

Initially, a charging record is generated by a service provider 115, 135, or 155 and received at a charging function (CHF) 160 or charging gateway (CGW) 165 at flow 405. Charging records may originate from different network elements, such as session management function (SMF), short message service function (SMSF), packet data network gateway (P-GW), etc. The charging record contains information about a device (e.g., international mobile subscriber identity (IMSI), etc.), type of usage, actual usage, etc.

The charging record is provided from charging function (CHF) 160 or charging gateway (CGW) 165 to charging message analyzer 170 at flow 410. The charging message analyzer retrieves information for the device (e.g., device service provider (SP) and/or enterprise, etc.) stored in a database (DB) 270 based on the device information in the charging record at flow 415. The charging message analyzer further retrieves the configuration (or set of rules) for the service provider (SP) and/or enterprise associated with the device from configuration store 175 based on the information retrieved from database (DB) 270 at flow 420.

Charging message analyzer 170 analyzes the retrieved rules to identify one or more destinations to send the charging record at flow 425. When the rules indicate that the charging record can be ignored, no further processing of the charging record is needed.

When one or more new destinations are identified, a loop is performed over the identified new destinations. For each new identified destination, charging message analyzer 170 directs streaming platform 180 to establish a new topic (or queue) for the new destination at flow 430. The charging message analyzer further establishes a new router instance (or record router) for the destination at flow 435. A topic name may be dynamically generated based on the destination of the message (e.g., <data.charging.SPName.DNN>, etc.). Setting up a new router instance for the destination can be achieved using various conventional or other techniques (e.g., Kubernetes (K8) controllers, etc.).

Once the new destinations are processed, another loop is performed to send information to the identified destinations for the charging record. Streaming platform 180 employs a publish/subscribe mechanism to distribute information. For example, information may be written to or placed on a queue associated with a topic, where the information is accessible to subscribers of that topic. For each identified destination, charging message analyzer 170 adds the charging record to a queue (or topic) of streaming platform 180 corresponding to the destination at flow 440. The queues (or topics) may be derived or ascertained from the rules for the associated service provider (SP) and/or enterprise (e.g., derived from stored associations between destinations and topics, indicated as destinations in the rules, etc.). A record router (e.g., record router 192, 194, 196, or 198) reads the charging record from the topic at flow 445. The charging record may be read based on the record router subscribing to the topic. The record router further retrieves the service provider (SP) and/or enterprise rules from configuration store 175 at flow 450. The rules may specify parameters for formatting a message to be sent to the corresponding destination (e.g., a service provider (SP) or enterprise system 195, etc.). The record router generates a message in the appropriate format (e.g., charging data record (CDR), etc.) based on the retrieved rules at flow 455 (e.g., type of record, 3rd Generation Partnership Project (3GPP) version, file or individual records, etc.). The record router may further combine multiple records to generate a single file for transfer or provide individual records based on the retrieved rules. The record router sends the generated message to the corresponding destination (e.g., service provider (SP) or enterprise system 195, etc.) at flow 460.

Device management platform 190 and/or systems 195 of the service providers (SPs) and/or enterprises may monitor devices in real-time, thereby enabling detection of anomalies and reporting of data as events occur. For example, the device management platform and/or systems of the service providers (SPs) and/or enterprises may utilize the usage data to detect anomalies or abnormal device operation. When an anomaly is detected for a device, the device management platform and/or systems of the service providers (SPs) and/or enterprises may perform various actions to remediate the anomaly in device operation (e.g., send notifications to the service providers and/or enterprises, disable the device, disable connectivity of the device or remove the device from the network, etc.).

In addition, the device management platform and/or systems 195 of the service providers (SPs) and/or enterprises may monitor the data and dynamically alter the rules to control data flow to improve system performance. For example, when the amount of data being received by systems of the service providers (SPs) and/or enterprises are slowing or impeding system performance or exceeding storage capacity, the rules may be dynamically modified (e.g., by the device management platform and/or systems of the service providers (SPs) and/or enterprises (and/or uploaded to the device management platform)) to control the data being sent to improve system performance (e.g., modify or reduce the types of data being sent, prevent zero-usage records from being sent, adjust the frequency of reporting, etc.).

FIG. 5 is a flowchart of an example method 500 for distributing charging records, according to an example embodiment. At operation 505, one or more processors of a device management platform receive, from a plurality of networks, usage data indicating usage of devices on the plurality of networks. At operation 510, the one or more processors of the device management platform apply rules to the usage data to identify requested usage data for entities associated with the devices, wherein the rules are defined by the entities to individually indicate the requested usage data. At operation 515, the one or more processors of the device management platform send the requested usage data to one or more destinations of the entities indicated by the rules.

Figure 6:
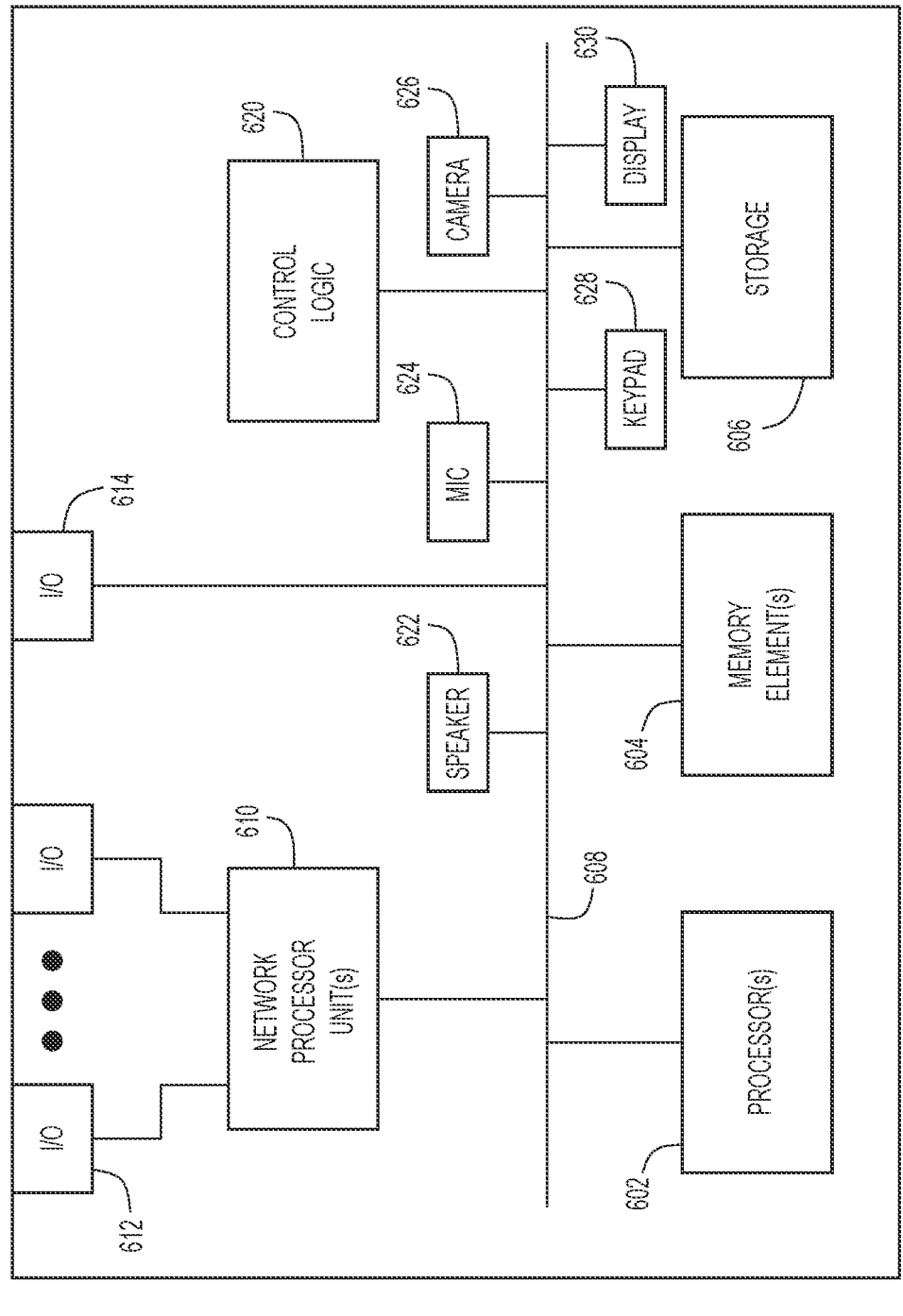
FIG. 6 illustrates a hardware block diagram of a computing device configured to perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any device entity/ entities (e.g., computer devices, server systems, user devices, device management platform, systems of the service providers (SPs) and/or enterprises, etc.) as discussed for the techniques depicted in connection with FIGS. 1-5 in order to perform operations of the various techniques discussed herein.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface (s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element (s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., driver(s) optical) and/or controller(s), wireless receivers/transmitters/transceivers, baseband processor(s)/ modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, network device, user device, etc.), computing device 600 may further include, or be coupled to, a speaker 622 to convey sound, microphone or other sound sensing device 624, camera or image capture device 626, a keypad or keyboard 628 to enter information (e.g., alphanumeric information, etc.), and/or a touch screen or other display 630. These items may be coupled to bus 608 or I/O interface(s) 614 to transfer data with other elements of computing device 600.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, device management platform 190 and/or systems 195 of the service providers (SPs) and/or enterprises may monitor devices in real-time, thereby enabling detection of anomalies and reporting of data as events occur. For example, the device management platform and/or systems of the service providers (SPs) and/or enterprises may utilize the usage data to detect anomalies or abnormal device operation. When an anomaly is detected for a device, the device management platform and/or systems of the service providers (SPs) and/or enterprises may perform various actions to remediate the anomaly in device operation (e.g., send notifications to the service providers and/or enterprises, disable the device, disable connectivity of the device or remove the device from the network, etc.).

In an embodiment, the device management platform and/or systems 195 of the service providers (SPs) and/or enterprises may monitor the data and dynamically alter the rules to control data flow to improve system performance. For example, when the amount of data being received by systems of the service providers (SPs) and/or enterprises are slowing or impeding system performance or exceeding storage capacity, the rules may be dynamically modified (e.g., by the device management platform and/or systems of the service providers (SPs) and/or enterprises (and/or uploaded to the device management platform)) to control the data being sent to improve system performance (e.g., modify or reduce the types of data being sent, prevent zero-usage records from being sent, adjust the frequency of reporting, etc.).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, standalone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly be connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X. Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: receiving from a plurality of networks, by one or more processors of a device management platform, usage data indicating usage of devices on the plurality of networks; applying rules to the usage data, by the one or more processors of the device management platform, to identify requested usage data for entities associated with the devices, wherein the rules are defined by the entities to individually indicate the requested usage data; and sending, by the one or more processors of the device management platform, the requested usage data to one or more destinations of the entities indicated by the rules.

In one example, the rules indicate a frequency of reporting the requested usage data to an entity.

In one example, a destination for an entity corresponds to a topic to which the entity is subscribed, and sending the requested usage data comprises providing the requested usage data to the topic.

In one example, the rules indicate a version of 3GPP support provided by an entity.

In one example, the entities include one or more from a group of a service provider and an enterprise.

In one example, the service provider provides 5G service.

In one example, the requested usage data includes charging data records.

In another form, an apparatus is provided. The apparatus comprises a device management platform comprising one or more processors configured to: receive usage data from a plurality of networks indicating usage of devices on the plurality of networks; apply rules to the usage data to identify requested usage data for entities associated with the devices, wherein the rules are defined by the entities to individually indicate the requested usage data; and send the requested usage data to one or more destinations of the entities indicated by the rules.

In another form, one or more non-transitory computer readable storage media are provided. The non-transitory computer readable storage media are encoded with processing instructions that, when executed by one or more processors of a device management platform, cause the one or more processors to: receive usage data from a plurality of networks indicating usage of devices on the plurality of networks; apply rules to the usage data to identify requested usage data for entities associated with the devices, wherein the rules are defined by the entities to individually indicate the requested usage data; and send the requested usage data to one or more destinations of the entities indicated by the rules.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

receiving from a plurality of networks, by one or more processors of a device management platform, usage data indicating usage of devices on the plurality of networks;

applying rules to the usage data, by the one or more processors of the device management platform, to identify requested usage data for entities associated with the devices, wherein the rules are defined by the entities and indicate for individual entities the requested usage data, a record format for sending the usage data to that entity, and one or more destinations of the entities corresponding to queues associated with topics to which the entities are subscribed;

sending, by the one or more processors of the device management platform, the requested usage data to the queues of subscribed topics based on the one or more destinations of the entities indicated in the rules; and sending, by the one or more processors of the device management platform, the requested usage data from the queues to the one or more destinations of the entities in the record format indicated by the rules.

2. The method of claim 1, wherein the rules indicate a frequency of reporting the requested usage data to an entity.

3. The method of claim 1, wherein sending the requested usage data comprises:

establishing a new topic for a new destination identified in the rules.

4. The method of claim 1, wherein the rules indicate a version of 3GPP support provided by an entity.

5. The method of claim 1, wherein the entities include one or more from a group of a service provider and an enterprise.

6. The method of claim 5, wherein the service provider provides 5G service.

7. The method of claim 1, wherein the requested usage data includes charging data records.

8. An apparatus comprising:

a device management platform comprising one or more processors configured to perform operations including:

receiving usage data from a plurality of networks indicating usage of devices on the plurality of networks;

applying rules to the usage data to identify requested usage data for entities associated with the devices, wherein the rules are defined by the entities and indicate for individual entities the requested usage data, a record format for sending the usage data to that entity, and one or more destinations of the entities corresponding to queues associated with topics to which the entities are subscribed;

sending the requested usage data to the queues of subscribed topics based on the one or more destinations of the entities indicated in the rules; and sending the requested usage data from the queues to the one or more destinations of the entities in the record format indicated by the rules.

9. The apparatus of claim 8, wherein the rules indicate a frequency of reporting the requested usage data to an entity.

10. The apparatus of claim 8, wherein sending the requested usage data comprises:

establishing a new topic for a new destination identified in the rules.

11. The apparatus of claim 8, wherein the rules indicate a version of 3GPP support provided by an entity.

12. The apparatus of claim 8, wherein the entities include one or more from a group of a service provider and an enterprise.

13. The apparatus of claim 8, wherein the requested usage data includes charging data records.

14. One or more non-transitory computer readable storage media encoded with processing instructions, that when executed by one or more processors of a device management platform, cause the one or more processors to perform operations including:

receiving usage data from a plurality of networks indicating usage of devices on the plurality of networks;

applying rules to the usage data to identify requested usage data for entities associated with the devices, wherein the rules are defined by the entities and indicate for individual entities the requested usage data, a record format for sending the usage data to that entity, and one or more destinations of the entities corresponding to queues associated with topics to which the entities are subscribed;

sending the requested usage data to the queues of subscribed topics based on the one or more destinations of the entities indicated in the rules; and sending the requested usage data from the queues to the one or more destinations of the entities in the record format indicated by the rules.

15. The one or more non-transitory computer readable storage media of claim 14, wherein the rules indicate a frequency of reporting the requested usage data to an entity.

16. The one or more non-transitory computer readable storage media of claim 14, wherein sending the requested usage data comprises:

establishing a new topic for a new destination identified in the rules.

17. The one or more non-transitory computer readable storage media of claim 14, wherein the rules indicate a version of 3GPP support provided by an entity.

18. The one or more non-transitory computer readable storage media of claim 14, wherein the entities include one or more from a group of a service provider and an enterprise.

19. The one or more non-transitory computer readable storage media of claim 18, wherein the service provider provides 5G service.

20. The one or more non-transitory computer readable storage media of claim 14, wherein the requested usage data includes charging data records.

* * * * *